United States Patent [19]

Kahan et al.

[11] 4,310,349

[45] Jan. 12, 1982

[54] HIGHLY ORIENTABLE IRON PARTICLES

[75] Inventors: Hillard M. Kahan, San Francisco; William F. Acebo, Hayward; Michael K. Stafford, Santa Clara, all of Calif.

[73] Assignee: Ampex Corporation, Redwood City, Calif.

[21] Appl. No.: 152,933

[22] Filed: May 23, 1980

Related U.S. Application Data

[63] Continuation-in-part of Ser. No. 89,782, Oct. 31, 1979, abandoned, which is a continuation of Ser. No. 8,949, Feb. 2, 1979, abandoned.

[51] Int. Cl.³ .............................................. B22F 9/00
[52] U.S. Cl. ................................ 75/0.5 R; 75/0.5 BA; 75/34
[58] Field of Search .................. 75/0.5 B, 0.5 BA, 3, 75/33–35, 0.5 R; 106/308 B, 1.05; 148/31.57, 31.55, 6.35; 252/62.56

[56] References Cited

U.S. PATENT DOCUMENTS

| | | | |
|---|---|---|---|
| 2,963,360 | 12/1960 | Cobel et al. | 75/3 |
| 3,185,563 | 5/1965 | Jones et al. | 75/3 |
| 3,558,371 | 1/1971 | Beckes | 148/31.57 |
| 3,607,219 | 9/1971 | Griessen et al. | 75/0.5 BA |
| 3,626,124 | 12/1971 | Denes | 148/31.57 |
| 3,653,875 | 4/1972 | Waters et al. | 75/33 |
| 4,050,962 | 9/1977 | Koester et al. | 75/0.5 BA |
| 4,072,501 | 2/1978 | Quinby | 75/0.5 BA |
| 4,155,748 | 5/1979 | Steck et al. | 75/0.5 BA |

OTHER PUBLICATIONS

Kiehl, S. J. et al.; "Temperature Coefficient in the Acid Hydration of Sodium Pyrophosphate", *JACS*, vol. 57 QD 1 A5(11/35).

*Primary Examiner*—Michael L. Lewis
*Attorney, Agent, or Firm*—Robert G. Slick; Joel D. Talcott

[57] ABSTRACT

Highly orientable acicular iron particles are made by reducing an acicular ferric oxide which has been coated with sodium tripolyphosphate.

4 Claims, No Drawings

HIGHLY ORIENTABLE IRON PARTICLES

REFERENCE TO RELATED APPLICATIONS

This application is a continuation-in-part of application Ser. No. 89,782 filed Oct. 31, 1979 now abandoned, which is a continuation of application Ser. No. 8,949 filed Feb. 2, 1979, now abandoned.

SUMMARY OF THE INVENTION

The magnetic particles used in making magnetic recording elements, such as magnetic tapes, generally consist of acicular gamma ferric oxide. It has long been recognized that iron itself would be superior to gamma ferric oxide with respect to signal-to-noise ratio, magnetic moment and coercive force.

Iron particles have not been used to any great extent in magnetic recording, despite the obvious advantages of iron, for the reason that in preparing the iron particles by known processes, the particles do not have the desired acicular shape and therefore are difficult to orient.

Chemical reduction processes have been used to prepare pure iron particles but the product may not have the desired acicular shape, and furthermore, the process is extremely expensive to carry out. The iron particles do not fit well into established procedures for processing pigments and preparing tapes or other magnetic storage media.

Others have proposed gaseous reduction methods of iron oxide particles but such processes ordinarily result in a metallic alloy pigment which does not lend itself to being magnetically oriented. Presumably, such gaseous reduction processes result in sintering and the destruction of the desired acicular shape of the iron particles.

In accordance with the present invention, a method is provided for rendering a magnetic iron oxide precursor suitable for gaseous solid state reduction to a metallic magnetic alloy pigment of high energy and which can be incorporated into a magnetic tape coating formulation with a high degree of magnetic orientability.

The present invention provides a method whereby an iron oxide particle having the desired shape is coated with an inorganic surfactant layer, i.e. sodium tripolyphosphate, and dried. This has the following advantages:

(a) keeps particles separated;

(b) prevents inter particle sintering by mass diffusion, and (c) sets up a material matrix. After standard solid state gaseous reduction, this material is in the form of a magnetic metallic alloy and exhibits and/or possesses:

(a) a higher degree of magnetic orientation when incorporated into a magnetic storage medium than material which is untreated or treated with other organic materials;

(b) mechanical integrity in the form of a material matrix when still in the pigment state just after reduction;

(c) a phosphate residue which is compatible with formulations used for incorporating magnetic pigments into various information storage formats, and (d) a high degree of stability in the pigment form or final storage format.

Such a surfactant layer is assumed to be caused by a certain bonding between phosphorous and iron ions through the oxygen ions, although this invention is not predicated on any theory of operation. The thus coated material can then be subjected to a solid state gaseous reduction in the presence of a reducing agent, such as hydrogen, to provide a magnetic metallic alloy which possesses a high degree of magnetic orientation and mechanical integrity. This matrix can be easily ground up to release the particles, and, in fact, the normal grinding of the pigment in the manufacture of magnetic tapes is adequate for this purpose.

The actual reduction of the iron oxide particles does not form a part of the present invention, but generally it can be said that the starting materials can be either red or yellow acicular ferric oxide or acicular gamma ferric oxide, and these are reduced to metallic iron in a stream of hydrogen gas. Preferably this is conducted at a relatively low temperature to prevent sintering and to preserve the acicular particle shape. Normally, the temperature must not be over 450° C. and preferably is not over 340° C. There is no lower limit as to the temperature except that the temperature must be high enough to make the reaction go fast enough to be economically feasible. Normally the minimum practical temperature of the conversion is about 275° C.

In carrying out the process, the iron oxide starting material is stirred with an aqueous solution of sodium tripolyphosphate and then dried. The proportion of the sodium tripolyphosphate to the iron oxide can vary from ½ to 10% by weight and preferably is about 4%. In many instances, it is preferred to repeat the treatment prior to reduction. Thus, one can treat with the solution, dry the product, and then treat again with the solution, followed by a second drying and subsequent reduction.

DESCRIPTION OF THE PREFERRED EMBODIMENTS

The following non-limiting examples illustrate various preferred embodiments of the present invention.

Example 1. The starting material was $\gamma$ $Fe_2O_3$ which had an average particle size of 1.0 micron by 0.15 micron. To 300 grams of the $\gamma$ ferric oxide, there was added a solution consisting of 7 liters of pure water with 12 grams of sodium tripolyphosphate dissolved therein. This was placed in a mixer and mixed overnight. The resulting mixture was then filtered to produce a moist filter cake and this was dried by placing it in a drying oven at 100° C. overnight. The dried material was then placed in a porcelain combustion boat in an electric furnace, and hydrogen gas introduced into the tube at a rate of 2 SCFH. After the tube had been purged with hydrogen gas for ten minutes, the tube was heated to a temperature of 340° C. for two to 20 hours. At the end of this time, the product is allowed to cool to room temperature and oxygen is slowly introduced in the presence of an inert gas; this stabilizes the material.

To provide a control, a second sample of the same magnetic oxide was reduced under exactly the same conditions except that the treatment with sodium tripolyphosphate was omitted.

The making of magnetic recording media, such as tapes or discs is well known to those skilled in the art. A typical teaching is found in the Ampex Graubert U.S. Pat. No. 3,320,090 wherein a mixture of two resins, phenoxy and polyurethane, serve to bind the magnetic particles to a backing material. In a typical manufacturing operation the magnetic pigment is first ground, e.g. in a ball or sand mill, with solvents to produce a pigment dispersion. The matrix material of the present invention is easy to break up and disperse in solvents in this usual preliminary pigment dispersing operation so that the reduced particles can be utilized in the usual tape making operation as soon as removed from the reactor in stabilized form without any additional processing. The amount of the matrix material is so small that it does not degrade the tape.

The two samples were then made up into a magnetic tape formulation using a standard resin formulation such as described above. The first step of the tape making operation consists of grinding the stabilized particles in a solvent to produce a dispersion. Both samples of freshly coated tape were oriented by placing them in a magnetic field.

The magnetic properties of the tape were then tested with the following results:

|  | Tripolyphosphate Treated | Control |
| --- | --- | --- |
| Squareness (Mr/Ms) | .80 | .68 |
| Coercivity ($H_c$) | 960 Oe | 960 Oe |
| Saturation Moment | 140 emu/gm | 135 emu/gm |
| Squareness Sum | 1.16 | 1.13 |

We claim:
1. In a process of reducing an acicular iron oxide to produce acicular metal particles suitable for magnetic recording by heating said acicular iron oxide in the presence of a reducing gas the improvement comprising treating the oxide particles with an aqueous solution of sodium tripolyphosphate, drying the thus treated oxide to produce a matrix, and reducing the oxide by subjecting the thus formed matrix to contact with a reducing gas at an elevated temperature.

2. The process of claim 1 wherein the proportion of the polyphosphate to the iron oxide is from ½ to 10% by weight.

3. The process of claim 1 wherein the iron oxide is γ ferric oxide.

4. The process of claim 1 having the following additional steps:
 (a) cooling the matrix to ambient temperature,
 (b) contacting the matrix containing reduced iron particles with an oxygen containing gas to produce stabilized iron particles and
 (c) grinding the thus stabilized iron particles in a solvent to produce a dispersion of iron particles in a solvent medium.